United States Patent [19]

D'Silva

[11] 4,201,601

[45] May 6, 1980

[54] COPPER BRAZING ALLOY FOILS CONTAINING GERMANIUM

[75] Inventor: Thomas L. D'Silva, Beaverton, Oreg.

[73] Assignee: GTE Sylvania Incorporated, Stamford, Conn.

[21] Appl. No.: 18,560

[22] Filed: Mar. 8, 1979

Related U.S. Application Data

[63] Continuation of Ser. No. 925,908, Jul. 19, 1978, abandoned.

[51] Int. Cl.$^2$ ............................................. C22C 9/00
[52] U.S. Cl. ........................................ 148/32; 75/153
[58] Field of Search .............. 75/153, 154, 156, 156.5, 75/157, 159, 160, 161, 162, 163, 164, 165, 173 R, 173 C, 173 A, 134 G; 428/606; 148/32

[56] References Cited

U.S. PATENT DOCUMENTS

| | | | |
|---|---|---|---|
| 3,158,471 | 11/1964 | Kadelburg | 75/165 |
| 3,427,155 | 2/1969 | Fox et al. | 75/170 |
| 3,579,312 | 5/1971 | Short | 75/165 |
| 3,600,144 | 8/1971 | Csakvony | 75/173 R |
| 3,856,513 | 12/1974 | Chen et al. | 75/171 |
| 4,124,380 | 11/1978 | Youdelis | 75/173 R |

FOREIGN PATENT DOCUMENTS

| | | | |
|---|---|---|---|
| 681890 | 10/1939 | Fed. Rep. of Germany | 75/173 C |
| 44-22062 | 9/1969 | Japan | 75/165 |
| 50-117632 | 2/1974 | Japan | 75/165 |

OTHER PUBLICATIONS

Jones, H.; Splat Cooling and Metastable Phases", *Rep. Prog. Phys.*, vol. 36, pp. 1427–1429, 1456–1457. (1973).

*Primary Examiner*—L. Dewayne Rutledge
*Assistant Examiner*—Michael L. Lewis
*Attorney, Agent, or Firm*—Donald R. Castle

[57] ABSTRACT

Alloys of the type $Cu_xGe_y$ wherein x is from about 60 to about 95 atomic percent and y is from about 5 to about 40 atomic percent are made ductile by the presence of appreciable amounts of an amorphous phase and a metastable, microcrystalline, solid solution single phase and are especially suited for fabrication of foil preforms for preplacement in the joint in a joining operation such as brazing.

3 Claims, No Drawings

COPPER BRAZING ALLOY FOILS CONTAINING GERMANIUM

CROSS REFERENCE TO RELATED APPLICATION

This application is a continuation of Ser. No. 925,908 filed July 19, 1978, now abandoned.

BACKGROUND OF THE INVENTION

Germanium is a temperature depressant and forms low melting eutectics in the Cu-Ge system. In the Cu-Ge system the germanium content is currently restricted to about 10 atomic percent because of the difficulty in fabricating foil, containing 10 or more atomic percent of germanium.

The disadvantage of the present techniques is the restriction on the germanium content in the Cu-Ge systems imposed by the inability to fabricate foils of alloys of high germanium content by conventional techniques. The present invention provides thin ductile foils of a higher germanium content in Cu-Ge system than heretofore attainable and enables brazing at temperatures lower than that afforded by foil of a lesser Ge content made by conventional techniques.

U.S. Pat. No. 3,856,513 discloses a wire product where alloys are represented by the formula $TiX_j$ wherein T is a transition metal and X is Al, Sb, Be, B Ge, C, In, P, Si or Sn. The transition metals include metals from Groups IB, IIIB, IVB, VB, VIB, VIIB and VIIIB of the periodic table. The patent also teaches that the alloys are partially crystalline but contain at least 50 percent of an amorphous phase. As is apparent from that description, about 280 binary alloys are disclosed and an infinite number of ternary, quaternary, etc. alloys. Specific examples are given to a $Pd_{77.5} Cu_6 Si_{16.5}$ alloy and a $Ni_{40} Pd_{40} P_{20}$ alloy. The patent also discloses ternary alloys of the formula $M_a Y_b Z_c$ in sheet, ribbon and powder form wherein M is Fe, Ni, Cr, Co or V, Y is P, C or B and Z is Al, Si, Sn, Sb, Ge, In or Be. These alloys also contain at least 50 percent of an amorphous phase and preferably are completely amorphous.

SUMMARY OF THE INVENTION

In accordance with one aspect of this invention there is provided alloys in the form of a thin foil having a thickness of from about 0.0005 to about 0.005 inches and a composition represented by the formula $Cu_x Ge_y$ wherein x is from about 60 to about 95 atomic percent and y is from about 5 to about 40 atomic percent. The composition contains a sufficient amount of an amorphous phase and a microstalline, metastable solid solution single phase to render the foil ductile.

DETAILED DESCRIPTION OF PREFERRED EMBODIMENTS

For a better understanding of the present invention, together with other and further objects, advantages and capabilities thereof, reference is made to the following disclosure and appended claims in connection with the above description of some of the aspects of the invention.

The Cu-Ge binary system is described in Hansen M. Constitution of Binary Alloys. Germanium is reported to have a substantial solid solubility in the Cu-Ge system.

In this invention, $Cu_x Ge_y$ type alloys wherein x is from about 60 to about 95 atomic percent and y is from about 5 to about 40 atomic percent are made in the form of ductile foil by the presence of sufficient amounts of an amorphous phase and a metastable, micro-crystalline, solid solution single phase by rapid cooling at a rate of about $10^5$ °C./sec. to $10^6$ °C./sec. Such a cooling rate can be obtained by available techniques such as melt extraction, melt spin, vapor deposition and sputtering. Some techniques of producing rapidly quenched foil have been described in U.S. Pat. Nos. 3,896,203; 3,863,700; 3,881,540 and 3,881,541. Depending on the cooling rate during the rapid quenching, the resulting structure would consist of a combination of an amorphous phase, new phases not available under equilibrium conditions and solid solutions with solubility limits extended beyond their equilibrium values, as described by Pol Duwez and R. H. Willens in Transactions of the Metallurgical Society of AIME, Vol. 227, p. 362, April 1963. The amorphous phase is intrinsically ductile because the glassy structure allows for slip in all possible directions. Additional ductility results from the presence of a metastable micro-crystalline, single phase, solid solution which has a large grain-boundary area. The thin ductile foil so obtained is especially suited for fabricating into preforms for brazing applications.

As previously mentioned the materials of this invention are in the form of a thin metal foil having a thickness of from about 0.0005 to about 0.005 inches. A preferred technique for producing such foils is by using a stream of molten metal to impinge upon the external surface of a rotating drum having a coolant inside the drum. The molten metal flows across the surface of the drum in the form of a sheet or strip that solidifies. The sheet or strip is removed from the surface of the drum as a continuous piece of alloy. Preferred thicknesses range from about 0.0015 to about 0.004.

Preferred alloy composition contain from about 15 to 35 atomic percent germanium and balance copper.

While there has been shown and described what are at present considered the preferred embodiments of the invention, it will be obvious to those skilled in the art that various changes and modifications may be made therein without departing from the scope of the invention as defined by the appended claims.

What is claimed is:

1. A brazing alloy material consisting essentially of a composition having the formula $Cu_x Ge_y$ wherein x is from about 60 to about 95 atomic percent, y is from about 5 to about 40 atomic percent and containing a sufficient amount of an amorphous phase and a metastable, microcrystalline solid solution phase to render the material ductile; said material being in the form of a sheet having a thickness of from about 0.0005 to about 0.005 inches.

2. A material according to claim 1 wherein x is from about 65 to about 85 atomic percent and y is from about 15 to about 35 atomic percent.

3. A material according to claim 1 wherein said thickness if from about 0.0015 inches to about 0.004 inches.

* * * * *